July 14, 1931. A. HOCK 1,814,927

VACUUM KETTLE

Filed Aug. 19, 1929 2 Sheets-Sheet 1

Inventor:
Alvin Hock,
By John Elias Jones,
Attorney

July 14, 1931.  A. HOCK  1,814,927

VACUUM KETTLE

Filed Aug. 19, 1929  2 Sheets-Sheet 2

Inventor:
Alvin Hock,
By John Elias Jones
Attorney

Patented July 14, 1931

1,814,927

UNITED STATES PATENT OFFICE

ALVIN HOCK, OF CINCINNATI, OHIO

VACUUM KETTLE

Application filed August 19, 1929. Serial No. 386,987.

This invention relates to a cooking vessel and, more particularly, to a steam-jacketed vacuum-kettle having a hinged lid or dome and that is adapted for use in the concentration of syrup and the manufacture of many preservable products.

An important object of the invention is to provide a cooking-vessel whose contents may be suitably heated in a partial vacuum until the required degree of concentration or condensation is produced and then quickly cooled to the desired temperature while the said vacuum is present and maintained.

Another object of the invention, however, is to provide a cooking-vessel that is easily accessible, especially for approaching and cleaning the interior without the necessity of detaching or delatching the vacuum connections.

A still further object of the invention herein is to provide means whereby a sample may be readily drawn off from either the upper or the lower portion of the cooking contents of the vessel for purposes of testing the state of the said contents without detriment thereto.

Other important objects and purposes of the invention, together with their advantages and special details of structure, will be fully hereinafter pointed out in the following description of the accompanying several sheets of drawings, in which—

Figure 1:
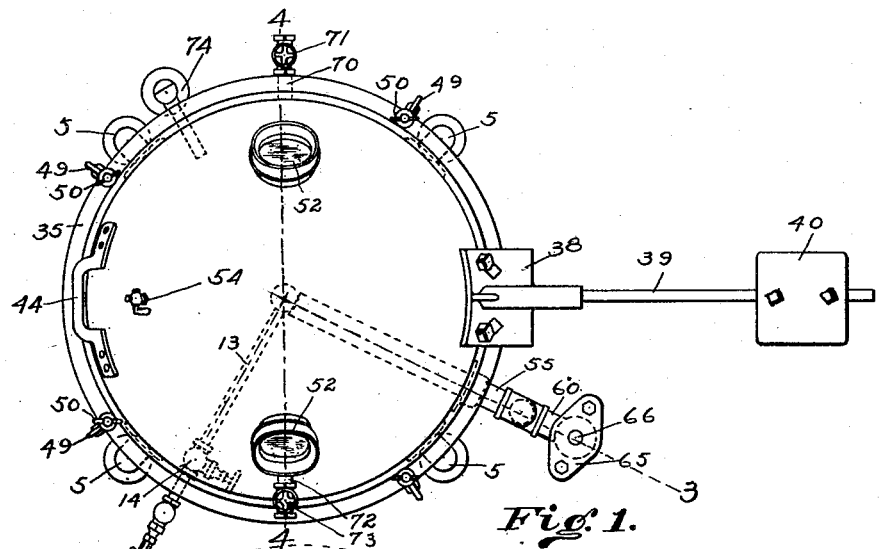
Figure 2:
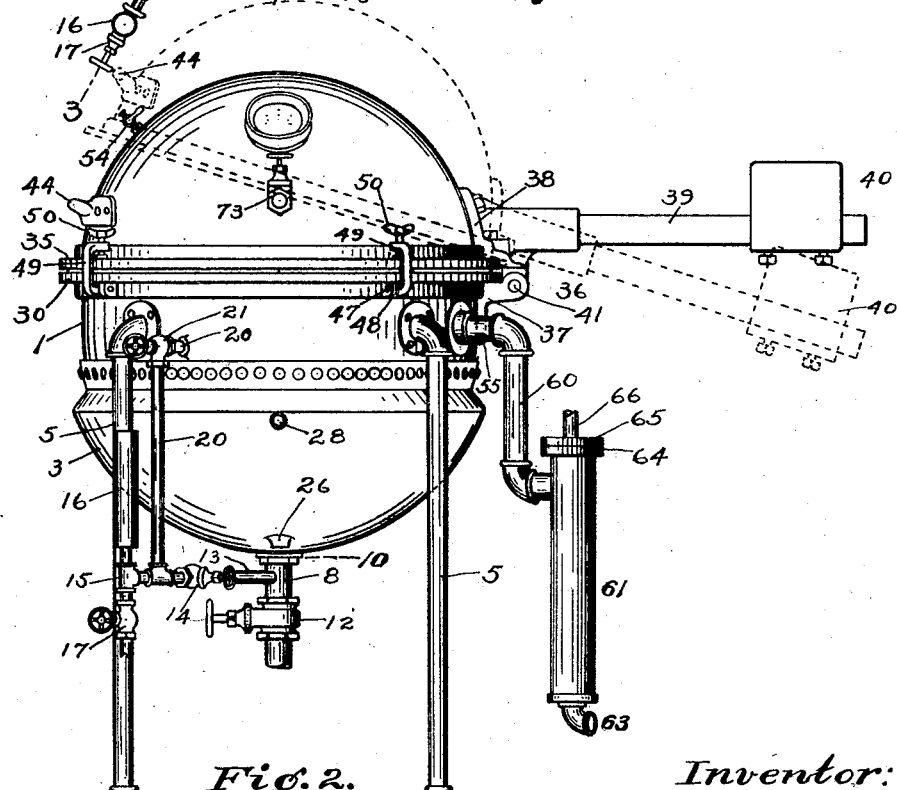
Figure 3:
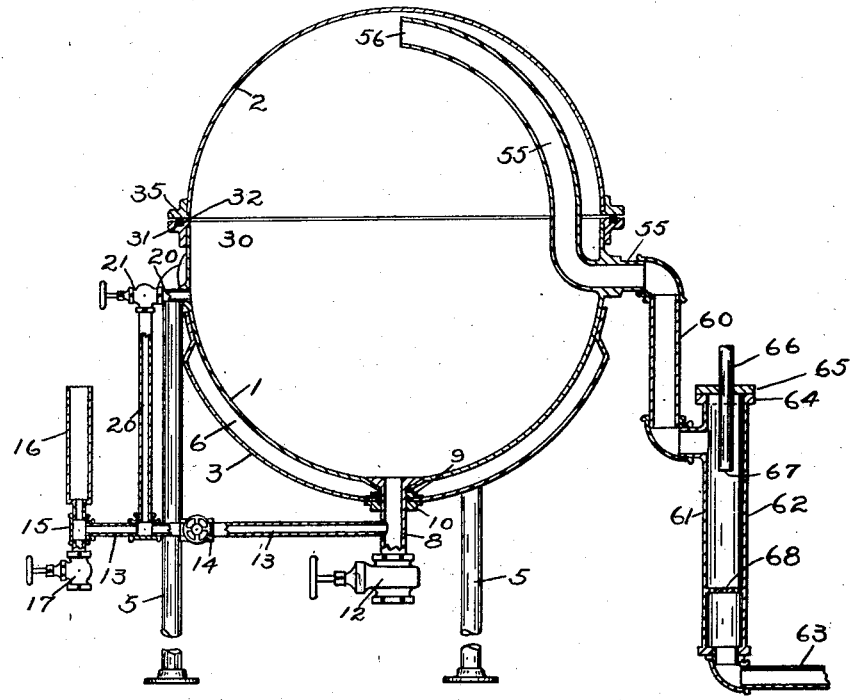

Figure 1 is a plan view of a cooking-vessel or vacuum-pan embodying my invention herein and showing the relative positions of the hinge, the balance-weight and the connections for the vacuum-pump, the sampling device and the filling-pipe; Fig. 2, a side elevation of the vessel shown in Fig. 1, illustrating the method of supporting it, the hinge feature, the balance-weight, the vacuum and sampling connections, and the discharge-valve, the lid or dome-cover being shown in partly open or raised position in dotted lines; Fig. 3, a vertical section, taken on the dotted line 3, 3, of Fig. 1, showing the vacuum-pipe secured to the lower portion of the vessel and extending to a point near the center of the top thereof; and Fig. 4, a vertical section, taken on the dotted line 4, 4, of Fig. 1, at right-angles to Fig. 3, showing the inlet and discharge openings to the jacket, the charging and discharging connections to the kettle, the vacuum-pipe (in elevation) and the usual pair of peep-windows or inspection-holes in the lid.

In carrying out my invention in practice, I provide a kettle or cooking-pan 1 having a dome or cover-lid 2 and supported on suitable standards 5 and, also, having a jacket 3 that is secured thereto at 4 and forms an air-tight joint at the parting, thus providing a space or annulus 6 between the bottom of the said kettle and said jacket 3.

At the bottom of the kettle 1, and duly secured thereto, I provide a vertical discharge-tube 8 which passes through the jacket 3 and is duly secured thereto by the flanged nuts 9 and 10, thereby forming an air-tight joint with same, the tube 8 being closed at its lower extremity by a valve 12.

Connected to the discharge-tube 8, and extending outwardly therefrom, is a horizontal pipe 13 controlled by a valve 14 which carries at its outer extremity a T-connection 15 having one opening upward to which a test-cup 16 is connected, and another opening downward which is controlled by a drain-valve 17.

Figure 4:
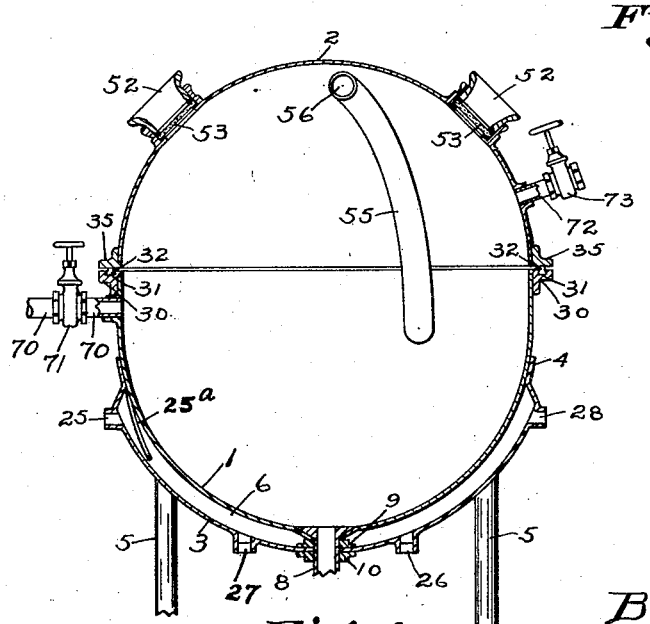

A steam-inlet 25, having a cushioning-baffle 25$^a$ is provided in the upper portion of the jacket 3, and a steam outlet or drain 26 is provided in said jacket at its bottom but on the opposite side of the central discharge-tube 8, a water-inlet 27 being provided in the bottom of said jacket 3 and a water-outlet 28 near its top, but directly opposite to that of the steam-inlet 25, (see Fig. 4.)

A circular flange 30 is suitably secured to the upper edge of the kettle 1 and is provided with a groove 31, into which latter a gasket 32 is seated or fitted.

A circular flange 35, which is a companion flange for the said flange 30, is suitably secured to the lower edge of the lid or cover 2 and adapted to rest on the gasket 32 to provide an air-tight joint between the kettle 1 and said cover 2. At the rear of the kettle 1 I provide a hinge 36 comprising a lower member 37 suitably secured thereto and to its flange 30, and an upper member 38 secured to the cover 2 and its flange 35 by suitable means and having a rearwardly-extending lever-arm 39 that is provided with an adjustably-held weight 40 and thereby adapted to counterbalance, or even slightly overbalance if desired, the cover 2 as it is raised from the kettle rim, and such weight is fulcrumed on the hinge-pin 41 just beyond the rim of the kettle.

At the front of the device I provide a handle 44 that extends from the cover 2 for use in lifting it to approach and clean the interior of the kettle or in handling its contents from above the rim.

Mounted on the underside of the flange 30 and fulcrumed on the pins 47, which latter have their bearing in the lugs 48 on the flange 30, I provide the cast-off C-shape cramps or clamps 49 having the winged screws 50 which engage the upper flange 35. These cramps 49 act to snugly hold the flanges 30 and 35 together when closed and they may be easily swung outward from said flanges on the pins 47, when said screws 50 are loosed, to permit the cover being raised, or thrown open for the desired access to the interior of the vessel.

In the upper portion of the cover 2 I provide the inspection openings or peep-windows 52 having transparent disks 53 mounted therein in the usual manner, and a relief-cock 54 is provided to break the vacuum when the cover 2 is to be opened or raised.

At the rear of the kettle 1, and near the hinge thereof, a vacuum suction-pipe 55 is provided which passes through the kettle 1, extending upward and forward within the vessel and following the inner curved contour of the vessel to a point near the center at the top of the cover 2 where the open end 56 of the pipe 55 is adapted to receive the vapors from the interior of the vessel, and leaving the interior wall of the lid clear and without any deposit thereon.

The vacuum-pipe 55 is connected outside the vessel to a vertical pipe 60 that leads downwardly into a condenser 61, the latter having a cylindrical body 62 closed at its bottom and connected by pipe 63 to an exhaust-pump (not shown) and, at the top, by the flange 64 that is secured to the body 62 and a flange 65 bolted thereto, and carrying the pipe 66 through which the condensing cooling-water is admitted, the pipe 66 extending downwardly within the condenser-body 62 to a point below the entrance of the pipe 60 thereinto.

A baffle-plate 68 of perforated metal is secured within the body 62 of the condenser below the end 67 of the pipe 66 to facilitate the condensation of the vapor from the kettle 1 by the cooling-water from the pipe 66.

Immediately below the flange 30 on one side of the kettle 1 I provide a charging-pipe 70 controlled by a valve 71 and at a point somewhat above the flange 35 of the cover 2, and on the cover 2, on the side opposite the pipe 70, is a charging-pipe 72 that is controlled by a valve 73, either or both of which may be used for introducing materials, to be cooled, into the kettle 1.

A thermometer 74 is provided in the usual manner on the kettle 1, below the flange 30 and forward of the charging-pipe 70, so that the inner temperature may be observed in a convenient manner at all times.

In operation, the cover 2 is brought into closed position, with the flange 35 resting on the gasket 32 in the flange 30 of the kettle 1, and the cast-off C-shape cramps or clamps then duly adjusted to the position shown in Figs. 1 and 2, the winged-screws 50 being then tightened so as to insure an air-tight joint between the kettle 1 and the cover 2; the materials to be treated are then introduced and steam supplied to the jacket 3 through the opening 25, the other openings 27 and 28 of the jacket itself being closed, and opening 26 connected to the steam-exhaust, thereby heating the contents of the vessel; the relief-cock 54 is then closed and the vacuum on pipe 63 started and the condensing-water, supplied through pipe 66, the heating may be carried on until the proper degree of concentration is reached, the temperature, indicated by the thermometer 74 (Fig. 1), being regulated by regulating the flow of steam to the jacket, while the condition of the contents may be observed through the inspection-openings 52 when the process is nearing completion, a quantity of the contents may be drawn off, after first breaking the vacuum and without any adjustment of the said cover 2, into the test-cup 16 from the upper portion by closing the valve 17 and opening the valve 21, or the desired sample may be taken, otherwise, from the bottom by opening the valve 14, the valve 17 being closed, and having valves 14 and 21 both closed, the contents of the test-cup may then be drawn or drained off by opening the valve 17. The cooking process having been completed the steam-supply, through connections 25 and 26, is discontinued, and these connections, being closed, cold water may be introduced into the jacket 3 through the connection 27, and exhausted through the connection 28, being continued until the contents of the vessel have cooled to the proper degree, the vacuum may be continued until the cooling is complete, when the water-supply through pipe 66 is discontinued, together with the vacuum on pipe 63.

The process having been completed the relief-cock 54 may be opened, thereby breaking or destroying the vacuum and the C-shape cramps or clamps 49 released, so that the cover 2 can be easily opened or raised and permitting the contents, that have been duly cooked, to be removed from the top, or, otherwise, drawn off, if desired, through the valve 12 at the bottom of the kettle.

It will be especially understood that the balancing of the kettle lid or cover 2 is a very important feature of my structure, as the said cover is very heavy and somewhat dangerous to handle where those below it might be severely injured or killed if it should fall or break away from its hinge, that might happen if the said balancing-weight 40 were not present to counterbalance it and render its swinging on its hinge comparatively easy. The heft of the cover is important in the successful operation of maintaining the vacuum in my kettle and the balancing-weight likewise important in the ready breaking of the vacuum.

It is obvious that, to avoid any chance of the gasket 32 being crushed or otherwise torn or disintegrated by the weight of the closing lid or cover 2, or the strong downward "pull" of the vacuum in the final sealing-stage of closing the lid, a number of compressible, adjustable-tension, cushion-springs (not shown) may be interposed between the flanged rim of the kettle and the lower flange-edge of the said lid, especially at the fore arc and the rear or hinge arc thereof, which will not affect the air-tight closure of the joint, but it will otherwise aid or facilitate the opening of the lid on the reaction of the springs when the vacuum within the device has been purposely broken and the cast-off cramps removed, and thus permitting the counterbalancing-weight to come into lowering action for a free and easy downward swing thereof, and the upward or rising swing of the lid. It is also thus quite obvious that but few of said cast-off cramps will be necessary, as the act of drawing the vacuum when the lid has been lowered to closing-place, will duly seat said lid on the gasket and hold it tightly closed, and with practically little need of said cramps whose function really becomes more of a visible emergency or safety one than that of an imperative or compulsory one.

It will also be readily seen that an important feature of my invention resides in the placing of all the inlet and outlet pipes, as well as the condenser and other mechanism below the level of the rim of the kettle 1, out of the way of the ready hinging of the dome or lid 2 and the vertical swinging-path of the counterbalance-arm, and that the interior surfaces of both the kettle and its dome are free from any obstructions or inwardly-extending parts, the only extending part into said dome being the upper end of the vacuum-pipe 55 that does not contact with said inner surface of said dome at all, and thus presenting a free and smooth inner surface of both kettle and dome, easily cleaned and drained and the said dome easily hinged sidewise away from said upper end of the vaccum-pipe 55 without any interference whatever and without any of said mechanism below the level of the kettle rim being in the way either. Besides, the said mechanism located as it is below the kettle rim is within easy reach of the operator of the device for inspection and repairs without disturbing the said dome above said rim. It will also be seen that there is no dismantling of any of the mechanism necessary when it is desired to raise, hinge or otherwise remove said dome, and access to the interior of the kettle is greatly facilitated thereby.

I claim:—

In a vacuum-kettle, the combination of a cooking kettle or pan, a pivotally-mounted or hinged lid or dome on the upper edge or rim of the said kettle and having air-tight joint therewith, cast-off means on said joint, a counterbalancing weighted-arm extending from said hinged dome, a suitably valved heating chamber or jacket in the bottom of said kettle, and a vacuum-producing means and steam inlet and water outlet means located on the kettle below the level of its rim and with the upper suction-end of said vacuum-producing means extending into said dome but not in secured or other contact therewith and following the inner contour of the cover and terminating directly beneath the inner central point of the cover, the said kettle and dome both being provided with smooth and unobstructed inner surfaces for both cleansing and draining purposes and the device as a whole having none of its vacuum and controlling valve mechanism located above the said level of the kettle rim, substantially as shown and described.

In testimony whereof I hereunto affix my signature.

ALVIN HOCK.